(12) United States Patent
Nilsson et al.

(10) Patent No.: US 6,222,962 B1
(45) Date of Patent: Apr. 24, 2001

(54) OPTICAL AMPLIFIER

(75) Inventors: Lars Johan Albinsson Nilsson, Suwon; Yong-woo Lee, Seoul; Sung-jun Kim, Songtan, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/192,272

(22) Filed: Nov. 16, 1998

(30) Foreign Application Priority Data

Nov. 14, 1997 (KR) ................................. 97-60016

(51) Int. Cl.[7] .................................................. G02B 6/34
(52) U.S. Cl. ................................ 385/37; 359/341; 385/24
(58) Field of Search .............................. 385/15, 24, 37, 385/123, 124; 359/127, 130, 341

(56) References Cited

U.S. PATENT DOCUMENTS

| 5,245,467 | * | 9/1993  | Grasso et al. ............... 357/341 |
| 5,557,442 | * | 9/1996  | Huber ........................... 359/179 |
| 5,572,357 | * | 11/1996 | Nakazato et al. ............ 359/341 |
| 5,598,294 |   | 1/1997  | Uno et al. .................... 359/341 |
| 5,608,571 | * | 3/1997  | Epworth et al. ............. 359/341 |
| 5,701,188 | * | 12/1997 | Shigematsu et al. ........ 359/161 |
| 5,861,980 |   | 1/1999  | Ono ............................. 359/341 |
| 6,061,172 | * | 5/2000  | Naito et al. .................. 359/341 |

FOREIGN PATENT DOCUMENTS

| 0 685 946 A1 | 12/1995 | (EP) . |
| 0685946 A1   | 12/1995 | (EP) . |
| 2161612      | 1/1986  | (GB) . |
| 2 293 936    | 4/1996  | (GB) . |
| 7-226560     | 8/1995  | (JP) . |
| 8-11550      | 4/1996  | (JP) . |
| 8-213681     | 8/1996  | (JP) . |
| 8-330650     | 12/1996 | (JP) . |
| 9-83489      | 3/1997  | (JP) . |
| 9-133934     | 5/1997  | (JP) . |
| 9-189824     | 7/1997  | (JP) . |
| WO 97/34379  | 9/1997  | (WO) . |

* cited by examiner

Primary Examiner—John D. Lee
Assistant Examiner—Michelle R. Connelly-Cushwa
(74) Attorney, Agent, or Firm—Robert E. Bushnell, Esq.

(57) ABSTRACT

An optical amplifier including a pumping optical source, a plurality of erbium doped optical fibers for amplifying optical signals of a plurality of wavelengths using pumping light generated by the pumping optical source, and a plurality of gratings alternately connected to the optical fibers, for reflecting an optical signal of a specific wavelength among different wavelength optical signals amplified by the optical fibers, wherein when optical signals for channels have different powers, the optical signal power for each individual channel is equalized by amplifying and reflecting the optical signals at different positions with different amplification gains. Accordingly, in a system having a great loss such as long-distance transmission, optical signals of different wavelengths are reflected at different positions, and amplified by a gain medium, thus making power equalization possible.

21 Claims, 5 Drawing Sheets

OPTICAL AMPLIFIER

CLAIM OF PRIORITY

This application makes reference to, incorporates the same herein, and claims all benefits accruing under 35 U.S.C § 119 from an application entitled Optical Amplifier earlier filed in the Korean Industrial Property Office on Nov. 14, 1997, and there duly assigned Ser. No. 97-60016 by that Office.

BACKGROUND OF THE INVENTION

1. Field of the Invention

The present invention relates to an optical amplifier, and more particularly, to an optical amplifier which equalizes the power of optical signals having different wavelengths.

2. Description of the Related Art

Optical amplifiers (OAs) are expected to be widely employed in future communications systems. Erbium doped fiber amplifiers (EDFAs) serve to periodically amplify an optical signal when a great amount of data is transferred over great distances via an optical fiber without regeneration, to compensate for attenuation of the optical signal caused by long-distance transmission.

Some new problems, however, occur, such as dispersion, during periodic amplification of an optical signal for long-distance transmission. Wavelength division multiplexing (WDM) represents a method of overcoming some of these problems. In WDM, a great amount of data is transmitted over several carriers, each with a different wavelength, and thus transmission speed and capacity are increased.

Assuming that an optical carrier represents one channel, optical power representing the strength of signals can evolve differently in different channels. These power differences can be very large, if the signals are attenuated and re-amplified repeatedly in the optical amplifier, or if they travel through different paths in an optical network.

The power differences can stem from the following reasons:

(1) The gains can be different in different channels. A further difficulty arises in that if the gain of an optical amplifier such as an EDFA is homogeneously broadened and changed, the gains at different wavelengths change by different amounts. Here, the homogeneous broadening represents filling ideal atom positions with all ions in a gain medium, i.e., branching each ion into an ideal energy level by the Stark effect. Furthermore, it can be difficult or even impossible to know which level of gain an OA will operate at, since the gain level may vary with time. Still, EDFAs that are gain-flattened or gain-equalized regardless of wavelengths and channels have been demonstrated, including those that are gain-flattened or gain-equalized independently of operating conditions. However, the gain will not be ideally flat or equal. In systems with many concatenated OAs, even small gain differences between channels can be detrimental, and lead to significant power differences; and (2) The signal attenuation due to loss between amplifiers can be different in different channels, resulting in significant power differences. As for the amplification, attenuation can also vary with time, and this variation in attenuation can be different in different channels or wavelengths in an unpredictable way.

It can be concluded that it is very unlikely that the gain will compensate for the attenuation at several wavelengths simultaneously for the majority of operating conditions (in contrast, for single wavelength systems, this occurs automatically at some wavelength so long as the loss does not exceed the gain available from the OAs). This is especially difficult since the attenuation between amplifiers conceivably changes with different wavelength dependencies for different reasons. Examples of the reasons can be splice degradation, incorporation of power splitters or other optical elements into the so transmission path, incorporation of dispersion compensating fibers, and increased micro-bending losses. In fact, with such an uncertainty in prediction of signal powers due to the dependence of the loss of the signal powers on the wavelengths, it is impossible to ensure a flat gain as the inter-amplifier loss changes, with homogeneously-broadened amplifiers like the EDFA.

Even if the gain and loss were always balanced for all channels, i.e., even if the sum of the gain and loss were 0 dB for all channels, this does not ensure that the powers in all channels would be equal. Unequal powers can still result for the following reasons:

(1) The signal powers applied to the system may be different at different wavelengths;

(2) Different signals may travel through different channels in a complex network with routing. When the channels are combined again, their powers will most likely be different from each other, unless some form of power control is employed for each individual channel; and (3) Tunable optical taps may be used, which may attenuate the channels selectively in an unpredictable way.

For many applications, it would be better if the OAs could make the power of the different channels equal (automatic power equalization) rather than make the gain equal. At least, power differences should be kept within certain bounds. This requires that the gain of a channel with a low input power outside the bounds should be higher than the gains of channels with powers inside the bounds.

Commercially available EDFAs cannot equalize the power differences between WDM channels because the gain of the EDFAs is homogeneously broadened at room temperature (normal temperature). As a consequence, the gain at one wavelength is almost the same as the gains at all other wavelengths. Thus, it cannot be said that the gain of a high power channel is smaller than that of a low power channel. In other words, gains depend on the wavelengths of the channels.

In contrast, in a non-homogeneously broadened amplifier, the gain at one wavelength is partially independent of the gains at other wavelengths. Here, the non-homogeneous broadening means that a Stark branch changes for each individual lasing ion. In long distance WDM, provided that the gain at other wavelengths is not affected, at least to some extent, the signal gain at one wavelength is reduced if the signal power at that wavelength becomes large. This is termed gain compression or gain saturation. On the other hand, if there is a strong signal compressing the gain at another wavelength, the gain can remain high at the first wavelength.

Several methods have been proposed to equalize the inter-WDM power differences. One method relies on the cooling of a gain medium, i.e., an EDF (erbium doped fiber), to very low temperatures. An erbium gain can be essentially and non-homogeneously broadened by cooling the EDF to a liquefied nitrogen temperature, resulting in a reduction in the uniform erbium line-width. While this method is reported to work quite well, the added complexity in devices resulting from the cooling is a significant drawback.

In another method, the erbium gain can remain essentially and homogeneously broadened, and the EDFA gain can be non-homogeneously broadened as a whole by amplifying other signal wavelengths in other portions of the EDFA. Thus, the EDF can operate at room temperature. In a method using a twin-core EDFA, as an example, paths traversed by different wavelengths are spatially separated, and a gain medium is thus effectively non-homogeneously broadened as a whole, although each and every point in the gain medium is predominantly homogeneously broadened. This method also suffers from some drawbacks. The twin-core EDFA is known to generate more noise than that of a single-core EDFA, an undesired polarization dependence may arise, considerable amounts of power are lost, and fabrication of the twin-core fiber can be difficult.

In yet another method, wavelengths for different channels are decoupled by wavelength-selective couplers (WSCs), and amplified in different EDFs. The gains of the different channels can thus be decoupled from each other, which corresponds to a non-homogeneous broadening. Drawbacks of this approach are that the amplifier becomes more complicated, and pumping power is not used in an effective way.

SUMMARY OF THE INVENTION

To solve the above problems, it is an object of the present invention to provide an optical amplifier which operates in a saturation state because optical signals at different wavelengths are reflected at different positions and amplified by gain media, to enable low-loss long-distance transmission by equalizing the power differences between wavelength division multiplexed (WDM) channels in a system incurring large losses, for example, a system for long-distance transmission.

Accordingly, to achieve the above object, there is provided an optical amplifier comprising: a pumping optical source; a plurality of optical fibers for amplifying optical signals of a plurality of wavelengths using pumping light generated by the pumping optical source; and a plurality of gratings alternately connected to the optical fibers, for reflecting an optical signal of a specific wavelength among different wavelength optical signals amplified by the optical fibers, characterized in that when optical signals for different channels have different powers, the optical signal power for each individual channel is equalized by amplifying and reflecting the optical signals at different positions with different amplification gains.

To achieve the above object, there is provided an optical amplifier comprising: a pumping optical source; an optical fiber for amplifying continuous spectral optical signals using pumping light generated by the pumping optical source; and a chirped grating for reflecting the amplified continuous spectral optical signals according to different wavelengths at different positions and outputting the result to the optical fiber amplifier, characterized in that when the powers of the continuous spectral optical signals are different at different wavelengths, the optical signal powers are equalized by amplifying and reflecting the optical signals at different positions with different amplification gains.

To achieve the above object, there is provided an optical amplifier comprising: a first optical amplification unit for amplifying and reflecting a plurality of wavelength optical signals at different positions according to wavelengths; a second optical amplification unit for amplifying and reflecting a plurality of wavelength optical signals at different positions according to the wavelength, which is different from the first optical amplifier in the amplification and reflection positions depending on the wavelengths; and an optical circulator for outputting input optical signals to the first optical amplification unit, outputting optical signals reflected by the first optical amplification unit to the second optical amplification unit, and outputting input optical signals reflected by the second optical amplification unit to a transmission path.

To achieve the above object, there is provided an optical amplifier comprising: a first optical circulator; a first optical amplification unit connected to the first optical circulator, for amplifying and reflecting a plurality of wavelength optical signals at different positions at different wavelengths; a second optical amplification unit for amplifying and reflecting a plurality of wavelength optical signals at different positions at different wavelengths, which is different from the first optical amplifier in the amplification and reflection positions depending on the wavelengths; and a second optical circulator for receiving optical signals output by the first optical circulator and transmitted via a transmission optical fiber from the first optical amplification unit and outputting the received signal to the second optical amplification unit, and outputting optical signals reflected by the second optical amplification unit to a transmission path.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
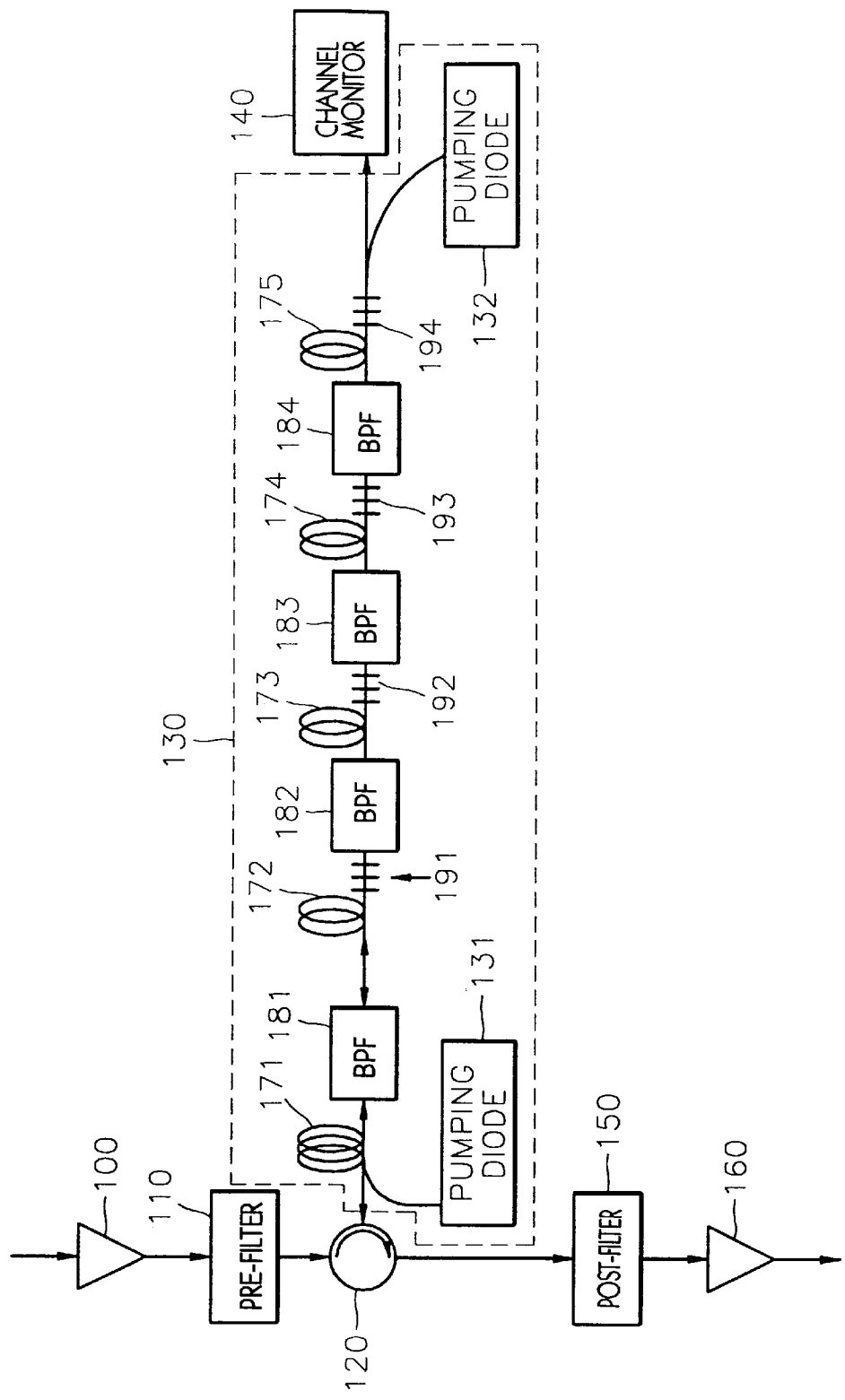
FIG. 1 is a block diagram of an optical amplifier according to a first embodiment of the present invention.

FIG. 1 is a block diagram of an optical amplifier with a fiber-grating cascade. The optical amplifier includes a preamplifier 100, a prefilter 110, an optical circulator 120, a power equalization amplification unit 130, a channel monitor 140, a postfilter 150, and a postamplifier 160.

The preamplifier 100 and the prefilter 110 amplifies and band-pass filters input multichannel optical signals. The optical circulator 120 outputs amplified and filtered optical signals to the power equalization amplification unit 130, and receives back optical signals whose power has been equalized and amplified by the power equalization amplification unit 130 and outputs the received signal to the postfilter 150 and the postamplifier 160. The postfilter 150 and the postamplifier 160 respectively band-pass filter and amplify the power-equalized multichannel optical signal. The channel monitor 140 connected to the power equalization amplification unit 130 shows the add/drop state of each channel.

The power equalization amplification unit 130 includes a plurality of EDFs 171 through 175, a plurality of bandpass filters 181 through 184, a plurality of Bragg gratings 191 through 194, each having a reflection bandwidth of 1 nm and an inter-grating reflection wavelength interval of 5 nm, pumping diodes 131 and 132 for EDF amplification.

We can have the following amplification gain of the power equalization amplification unit 130 having such a configuration. When $L_k$ is the length of a k-th EDF, $f_k(\lambda)$[dB] is attenuation of a k-th filter, $g_k^*(\lambda)$[dB/m] is the gain at the population inversion of a k-th EDF, and $\alpha_k(\lambda)$[dB/m] is a k-th small signal absorption spectrum (in principle, $g_a^*$ and $\alpha_a$ are different from $g_b^*$ and $\alpha_b$, but it is assumed that they are the same. In particular, it is profitable assuming that two different types of EDFs are identical to each other when they are incorporated into a hybrid EDF, the gain $G_i$ of the power equalization amplification unit 130 at each individual wavelength $\lambda_i$ is expressed by the following Equation 1:

$$G_i = 2\sum_{k=1}^{i}[(g_k^{*i} + \alpha_k^i)n_{2,k} - \alpha_k^i]L_k - f_k^i \qquad (1)$$

$$= 2\sum_{k=1}^{i}[g_{p-p,k}^{*i}n_{2,k} - \alpha_k^i]L_k - f_k^i$$

wherein $f_k(\lambda_i) \equiv f_k^i$ is given, $g_{p-p,k} \equiv g_k^* + \alpha_k$ denoting a gain swing is given, and $n_{2,k}$ states the ratio of erbium ions that are excited in a k-th EDF.

Assuming that all the EDFs are the same for simplicity, the gain swing of each EDF, $g_{p-p,k} \equiv g_k^* + \alpha_k$, is identical, and then Equation 1 can be expressed as follows:

$$G_i = 2g_{p-p}^i\sum_{k=1}^{i}n_{2,k}L_k - 2\alpha^i\sum_{k=1}^{i}L_k - 2\sum_{k=1}^{i}f_k^i \qquad (2)$$

$$= 2\sum_{k=1}^{i}[g_{p-p}^i n_{2,k} - \alpha^i]L_k - f_k^i$$

In amplifiers having this gain, $n_{2,k}$ is perturbed by $\Delta n_{2,k}$ with amplifiers perturbed, and the gain changes as in the following Equation 3:

$$\Delta G_i = 2\sum_{k=1}^{i}g_{p-p,k}^i \Delta n_{2,k}L_k = 2g_{p-p}^i\sum_{k=1}^{i}\Delta n_{2,k}L_k \qquad (3)$$

wherein the second expression is the case of identical EDFs. A gain change difference $\Delta^2 G_{ij}$ between two wavelengths $\lambda_i$ and $\lambda_j$ is expressed by the following Equation 4:

$$\Delta^2 G_{ij} = \Delta G_j - \Delta G_i \qquad (4)$$

$$= 2\sum_{k=1}^{i}g_{p-p,k}^j \Delta n_{2,k}L_k - 2\sum_{k=1}^{i}g_{p-p,k}^i \Delta n_{2,k}L_k$$

$$= 2\sum_{k=i+1}^{i}g_{p-p,k}^j \Delta n_{2,k}L_k - 2\sum_{k=1}^{i}g_{p-p,k}^{ij}\Delta n_{2,k}L_k$$

wherein $\Delta g_{p-p,k}^{ij} \equiv g_{p-p,k}^j - g_{p-p,k}^i$ is given.

If all the EDFs are the same and i is smaller than j, Equation 4 becomes the following Equation 5:

$$\Delta^2 G_{ij} = 2g_{p-p}^j\sum_{k=1}^{i}\Delta n_{2,k}L_k - 2g_{p-p,k}^i\sum_{k=1}^{i}\Delta n_{2,k}L_k \qquad (5)$$

$$= 2g_{p-p}^j\sum_{k=i+1}^{i}\Delta n_{2,k}L_k - 2g_{p-p,k}^{ij}\sum_{k=1}^{i}\Delta n_{2,k}L_k$$

It can be seen from Equation 5 that if different types of EDFs are used, better power equalization can be possible. Gratings can be directly formed on the EDFs, and thus simply formed from the EDFs if the filters 181 through 184 of FIG. 1 are not used. For simple understanding, provided that $\Delta g_{p-p,k}^{ij}$ is zero, Equation 5 becomes the following Equation 6:

$$\Delta^2 G_{ij} = 2\sum_{k=i+1}^{i}g_{p-p,k}^j \Delta n_{2,k}L_k = 2g_{p-p}^j\sum_{k=i+1}^{i}\Delta n_{2,k}L_k \qquad (6)$$

wherein the second equal sign is for identical EDFs.

With an inter-wavelength gain change that is the same as in Equation 6, when several channel optical signals are input to the power equalization amplification unit 130, one channel must be greater amplified than others if the first channel has weaker power than the others. Provided that i is a low power channel and j is a high power channel considering $\Delta^2 G_{ij}$, $\Delta^2 G_{ij}$ is smaller than 0 because a gain compression is smaller for i than for j.

I In the second expression in Equation 4, $\Delta^2 G_{ij}$ is divided into two terms: the first one corresponds to a change in gain compression for one channel; and the second corresponds to a difference between changes of gain compression for two channels. If $\Delta^2 G_{ij}$ is zero, the second term disappears, and Equation 4 becomes Equation 6. The characteristics of the power equalization amplification unit 130 are affected to some extent by selection of an EDF whose gain is compressed faster or slower than that of a general EDF with respect to wavelengths passing through a EDF-grating cascade. The above-described second term does not contribute to the power equalization amplification unit, and thus if it is supposed to be zero, the first term corresponds to the gain faced by a signal at a wavelength traversing the EDF-grating cascade. This requires consideration of the following four cases.

The first case is when a channel traveling farthest in the power equalization amplification unit has the strongest signal power. In this case, the farthest-traversed optical signal compresses the gains of previous EDFs by equal amounts, and is again compressed in an EDF (e.g., reference numeral 175) that is not traversed by other wavelengths. Hence, the gain for the farthest-traveling signal is more compressed than that for other wavelengths. If i is smaller than j, and the power of a j-th channel is large, $n_{2,k}$ in this case is reduced in all EDFs, and thus $\Delta n_{2,k}$ is smaller than zero. This value is reduced with respect to k (i<k≦j), and thus $g_{p-p}$ and L each are larger than 0. Accordingly, $\Delta^2 G_{ij}$ of Equation 6 is smaller than zero.

The second case is when a channel reflected in the front portion of the power equalization amplification unit has the weakest optical signal power. In this case, results diametrically opposite to the first case are incurred.

The third case is when the channel reflected in the front portion of the power equalization amplification unit has the strongest optical signal power. In this case, each optical signal compresses the gain of an EDF (e.g., reference numeral 172) placed in the front portion, and other unreflected signals travel through subsequent EDFs. The power of the signal having traversed the front EDFs becomes smaller, and gain compression occurring in the next EDFs is also reduced. The gains of channels passing through the next EDFs increases partially from the gain reduced in the front EDF. Thus, a strong signal reduces the gain of the front EDF for other channels and itself as well. However, the other channel gains increase partially in the EDFs at the rear portion.

The fourth case is when a channel traveling farthest in the power equalization amplification unit has the weakest optical signal power. In this case, results diametrically opposite to the third case are obtained.

Considering the worst power equalizing case with reference to the above-described cases, wavelength reflection caused by each of the gratings 191 through 194 can be determined to accomplish power equalization in all possible cases, when the second term of Equation 4 is not set to be zero.

Transmission (i.e., unreflection) of optical signals at wavelengths to be reflected by these gratings is negligible because the gratings 191 through 193 have sufficiently high reflectivities.

The filters 182 through 184 can be replaced by attenuators or EDFs doped with samarium ($Sm^{3+}$), and serve two purposes. First, they shape the spectrum so that a specific channel power dominates in a specific EDF-grating (hereinafter, called a segment). Hence, the gain compression in that segment is controlled by the power of that channel power. Second, the filters allow the total gain in all the EDFs to be higher than the net gain of the power equalization amplification unit, thus improving the power equalization.

The plurality of optical fibers 171 through 175 can be identical EDFs or different optical fibers for performance improvement. That is, in a specific segment where a specific wavelength is dominant, performance can be improved by selection of an optical fiber allowing the gain swing of EDFs in that wavelength to be high and the gain swing in other channel wavelengths in that segment to be low. For example, a phosphosilicate EDF or alumino-phosphosilicate EDF can be used in a segment where the shortest wavelength channel is dominant among the plurality of channels. A germanosilicate EDF can be used in a segment where the next-long wavelength channel is dominant. An aluminosilicate EDF can be used in a segment where a long wavelength channel is dominant. Here, samarium can be added to the respective EDFs to cause loss to each EDF.

Figure 2A:
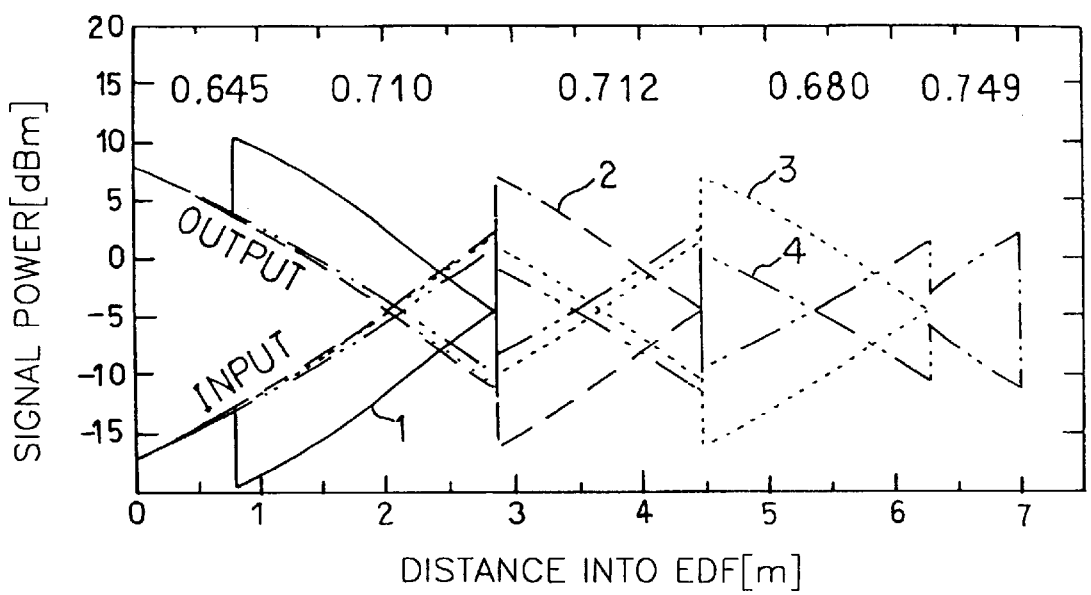
FIGS. 2A and 2B are graphs showing evolution of channel powers as signals of four channels travel in the power equalization amplification unit of FIG. 1.
Figure 2B:
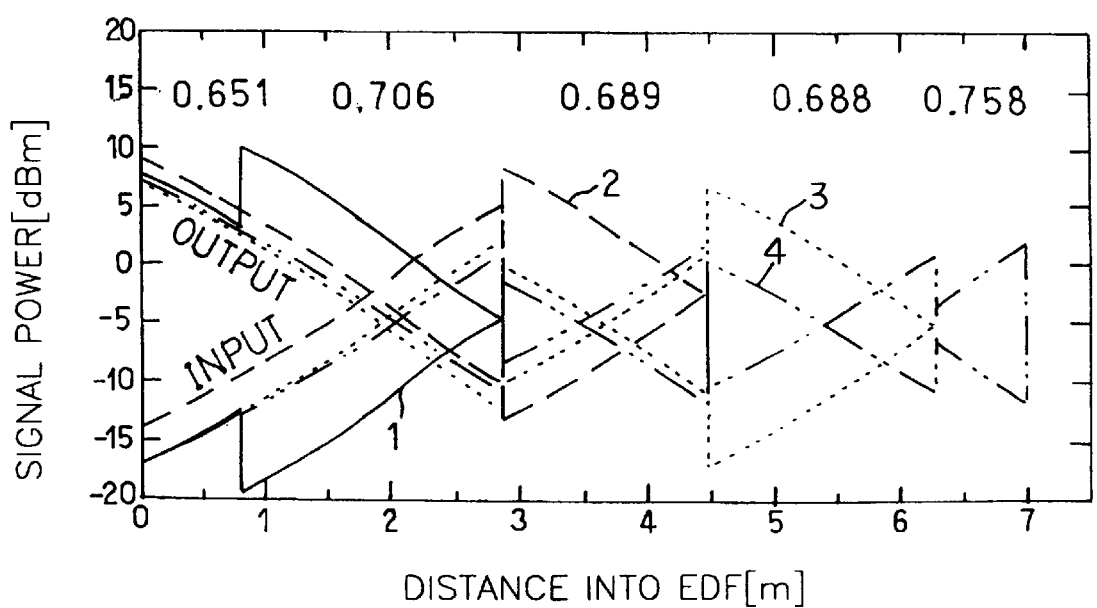
Figure 3A:
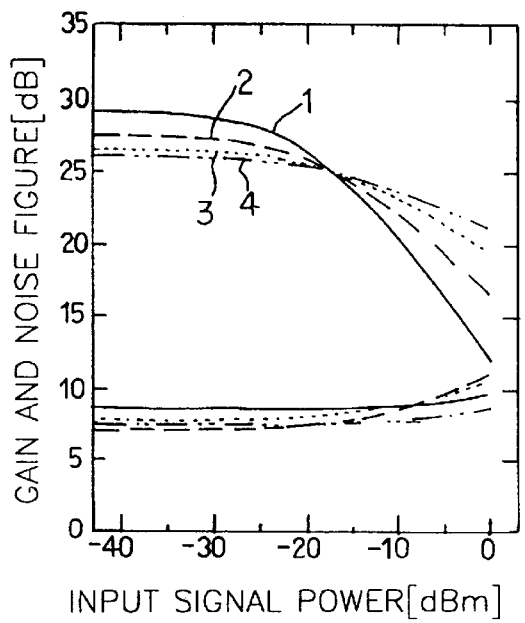
FIGS. 3A through 3D are graphs showing gain and noise figure for the case of FIGS. 2A and 2B.
Figure 3B:
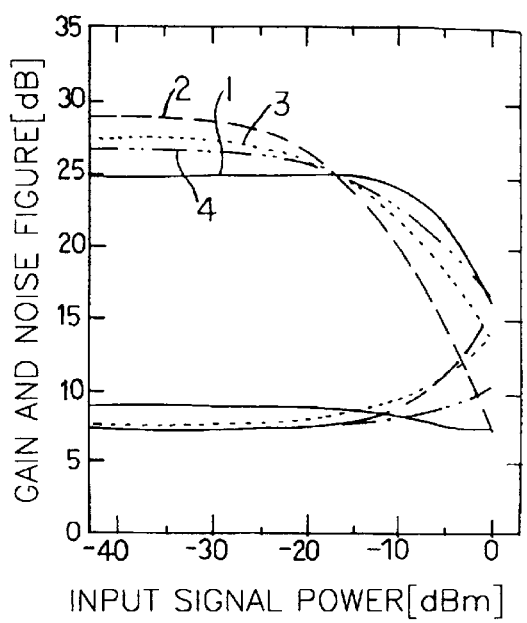
Figure 3C:
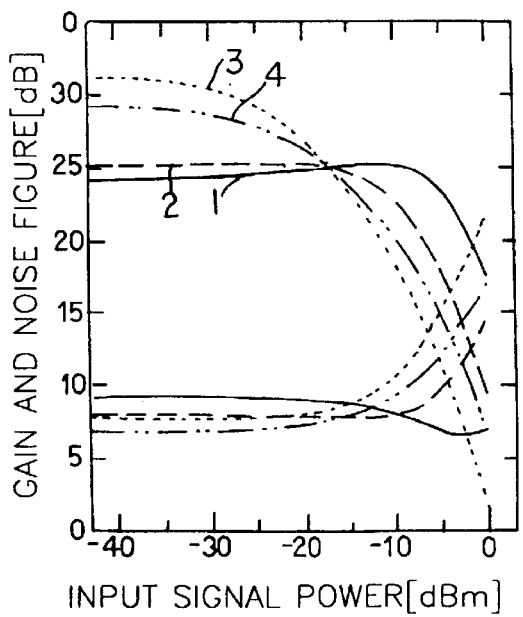
Figure 3D:
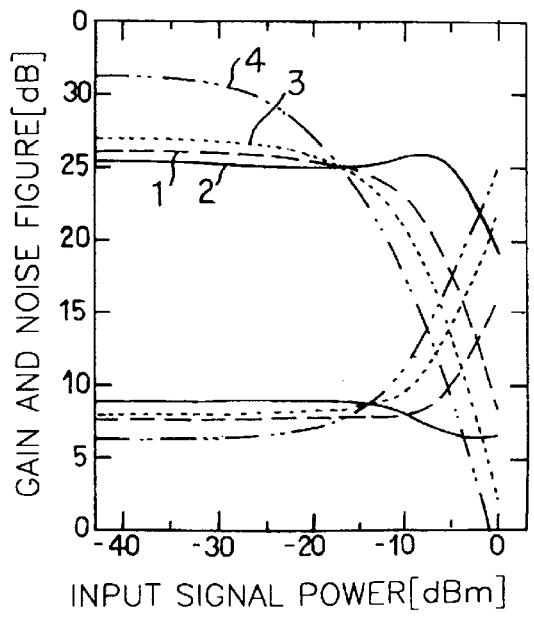

FIGS. 2A and 2B show channel powers evolving as the signals travel into different EDFs and are reflected by or pass through respective gratings in the power equalization amplification unit of FIG. 1. FIG. 2A shows the results of an experiment under nominal operating conditions, and FIG. 2B shows the results of an experiment when the input power at 1550.1 nm is about 3 dB high. The numerals on the upper edge of the figure state the ratio of erbium ($Er^{3+}$) ions that are excited in a specific segment. Lines 1, 2, 3 and 4 indicate the input powers of channels respectively having wavelengths 1545.3 nm, 1550.1 nm, 1554.0 nm, and 1559.8 nm. In channel 1, a gain reduction of about 1.74 dB occurs. Channels 2, 3, and 4 experience gain decreases of 0.18 dB, 1.2 dB, and 0.7 dB, respectively.

FIGS. 3A–3D show gain and noise figures for the four channels input to the optical amplifier of FIG. 1. The input power of one channel varies from −17 dBm, and the input powers of the other three channels are in each case kept at −17 dBm. Again, lines 1, 2, 3 and 4 indicate the input powers of channels respectively having wavelengths 1545.3 nm, 1550.1 nm, 1554.0 nm, and 1559.8 nm. In each drawing, upper channel lines represent gains, and lower channel lines represent noise figures. The figures show that input powers of channels 1, 2, 3 and 4 are changed respectively in FIGS. 3A through 3D, and the signal powers of the other three channels are thus fixed. As described above, when the input power of one channel is changed and the input powers of the others are fixed, the gain of the channel with changing input power in each figure is adjusted to equalize the channel powers.

Figure 4:
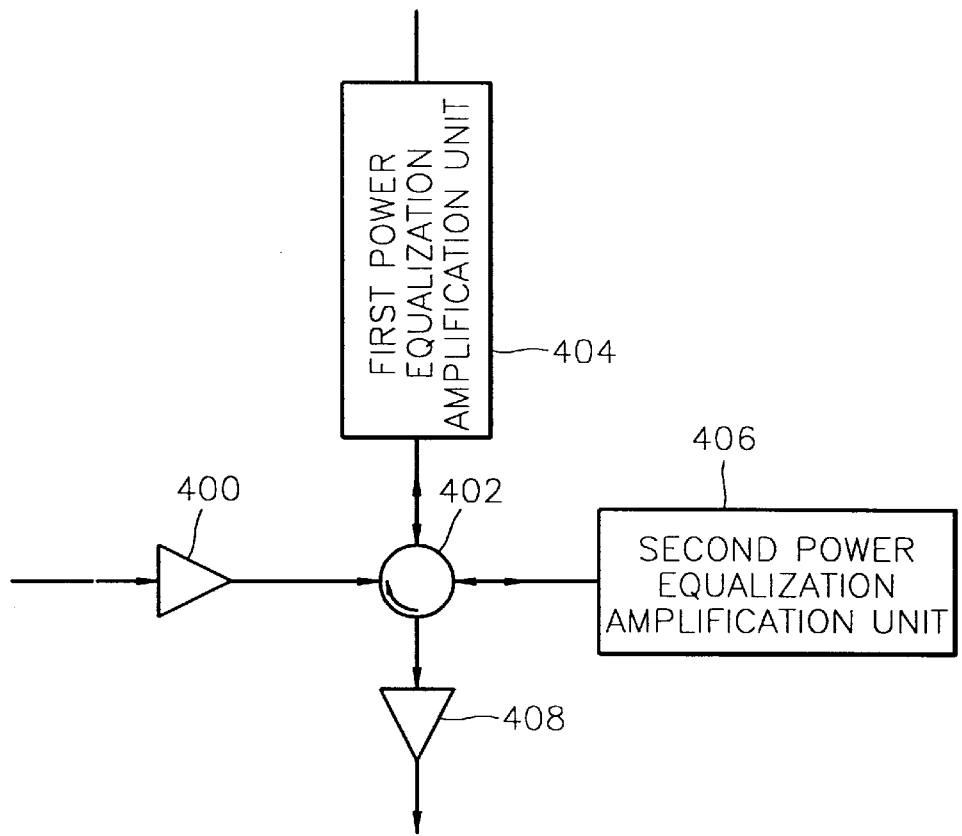
FIG. 4 is a block diagram of a second embodiment of the present invention.

FIG. 4 shows a second embodiment of the present invention. Referring to FIG. 4, an optical amplifier includes a preamplifier 400, an optical circulator 402, a first power equalization amplification unit 404, a second power equalization amplification unit 406, and a postamplifier 408.

The preamplifier 400 amplifies an input optical signal, and the optical circulator 402 outputs an amplified optical signal to the first power equalization amplification unit 404. An optical signal amplified by the first power equalization amplification unit 404 is input to the second power equalization amplification unit 406 again via the optical circulator 402. An optical signal amplified by the second power equalization amplification unit 406 is input to the postamplifier 408 again via the optical circulator 402. The postamplifier 408 again amplifies an input optical signal.

The first and second power equalization amplification units 404 and 406 have the same structures as the power equalization amplification unit 130 of FIG. 1. Here, the grating arrangement of the second power equalization amplification unit 406 is different from that of the first power equalization amplification unit 404. For example, if the gratings 1, 2, 3 and 4 of the first power equalization amplification unit 404 sequentially reflect optical signals of different wavelengths, the gratings of the second power equalization amplification unit 406 can be arranged in the sequence 2-3-4-1, 3-4-1-2, 4-1-2-3, 2-4-1-3, 4-2-3-1, 1-3-2-4, or 3-1-4-2.

Figure 5:
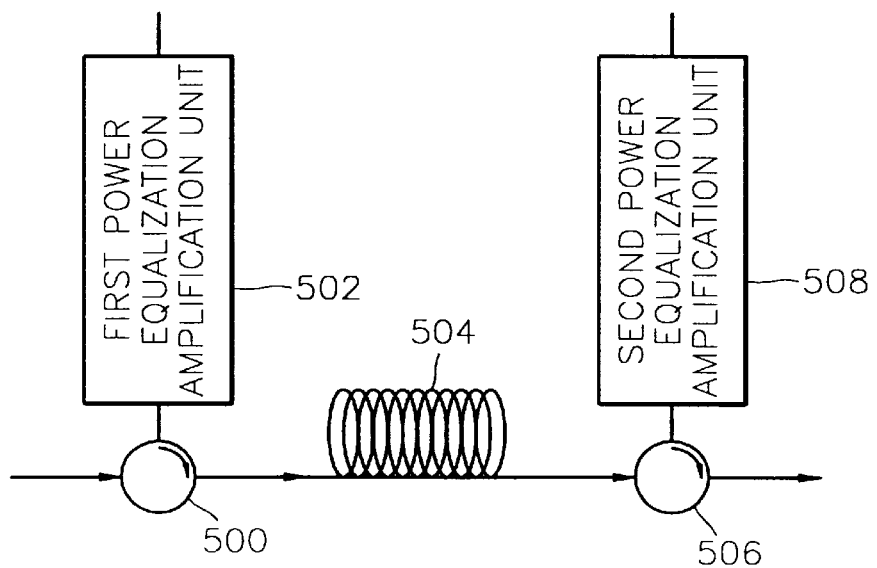
FIG. 5 is a block diagram of a third embodiment of the present invention.

FIG. 5 shows a third embodiment of the present invention. Referring to FIG. 5, an optical amplifier includes a first optical circulator 500, a first power equalization amplification unit 502, a communications optical fiber 504, a second optical circulator 506, and a second power equalization amplification unit 508.

The first optical circulator 500 outputs an input optical signal to the first power equalization amplification unit 502, and receives an optical signal power equalized and amplified by the first power equalization amplification unit 502 and outputs the same to the next port via the communications optical fiber 504. The second circulator 506 outputs an optical signal input via the communications optical fiber 504 to the second power equalization amplification unit 508, and receives an optical signal power-equalized and amplified by the second power equalization amplification unit 508 and outputs the same to the next port.

The first and second power equalization amplification units 502 and 508 have the same structure as the power equalization amplification unit 130 of FIG. 1, and are different from each other in their grating arrangements, similar to the case of FIG. 4.

Figure 6:
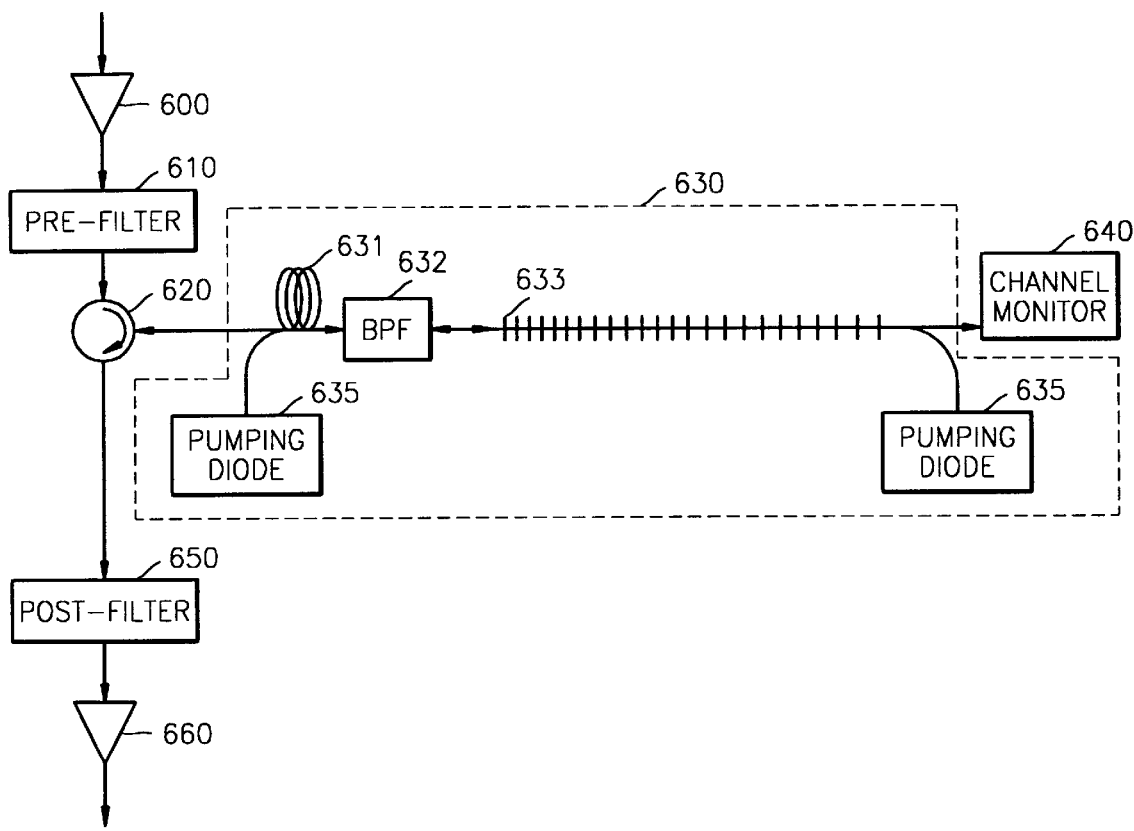
FIG. 6 is a block diagram of an optical amplifier for equalizing the power of continuous spectral optical signals according to the principles of the present invention.

FIG. 6 is a block diagram of the structure of an optical amplifier which power equalizes continuous spectral optical signals, according to the present invention. Referring to FIG. 6, an optical amplifier includes a preamplifier 600, a prefilter 610, an optical circulator 620, a power equalization amplification unit 630, a channel monitor 640, a postfilter 650, and a postamplifier 660.

The preamplifier 600 and the prefilter 610 amplifies and bandpass-filters continuous spectral input optical signals.

The optical circulator 620 outputs the amplified and filtered optical signal to the power equalization amplification unit 630, and receives back an optical signal power-equalized by the power equalization amplification unit 630 and outputs the received signal to the postfilter 650. The postfilter 650 and the post amplifier 660 bandpass-filters and amplifies the power-equalized continuous spectral optical signals. The channel monitor 640 connected to the power equalization amplification unit 630 shows the add/drop state of channels.

The power equalization amplification unit 630 includes an EDF 631, a bandpass filter 632, a chirped grating 633, a first pumping diode 634, and a second pumping diode 635.

The chirped grating 633 reflects an optical signal of a continuous wavelength band at different positions of gratings. Here, the reflection wavelength band is 20 nm, and its length is about 1 nm. When an optical signal is reflected by the chirped grating, the chirped grating includes a long period grating or a blazed grating on its upper portion to attenuate the optical signal. It is preferable that the EDF 631 also has loss. For example, an optical fiber doped with samarium is appropriate.

However, since the chirped grating usually disperses an optical signal, for example, two identical gratings chirped in opposite directions to each other can be included to compensate for the dispersion.

The power equalization amplification unit 630 can be applied to the power equalization amplification units 404, 406, 502, and 508 of the optical fibers shown in FIGS. 4 and 5. In this case, two chirped gratings used in the power equalization amplification unit of each of the optical amplifier can be chirped in opposite directions to each other.

All the characteristics, methods, or process steps disclosed in the present specification can be combined with each other, excluding mutually exclusive elements. Each property disclosed in the present specification can be even replaced by an alternative for accomplishing the same, equivalent, or similar object. Therefore, each disclosed property is just an example, and the present invention is not limited to the above embodiments. The present invention is broadened up to novelty of the disclosed characteristics or a combination of the novelties, and likewise for the steps of a method or process.

According to the present invention, in a lossy system such as a system for long-distance transmission, optical signals of different wavelengths are reflected at different positions, and amplified by gain media, thus making power equalization possible. Also, optical amplifiers for optical signal transmission are cascaded, thus allowing power equalization upon long-distance transmission.

What is claimed is:

1. An optical amplifier comprising:
   a pumping optical source;
   a plurality of optical fibers for amplifying optical signals of a plurality of wavelengths using pumping light generated by the pumping optical source;
   a plurality of gratings alternately connected to the optical fibers, for reflecting an optical signal of a specific wavelength among different wavelength optical signals amplified by the optical fibers; and
   a plurality of bandpass filters connected respectively to the gratings to give losses to optical signals passing through the gratings,
   characterized in that when optical signals for different channels have different powers, the optical signal power for each individual channel is equalized by amplifying and reflecting the optical signals at different positions with different amplification gains.

2. An optical amplifier comprising:
   a pumping optical source;
   a plurality of optical fibers for amplifying optical signals of a plurality of wavelengths using pumping light generated by the pumping optical source;
   a plurality of gratings alternately connected to the optical fibers, for reflecting an optical signal of a specific wavelength among different wavelength optical signals amplified by the optical fibers; and
   a plurality of attenuators connected respectively to the gratings to give losses to optical signals passing through the gratings,
   characterized in that when optical signals for different channels have different powers, the optical signal power for each individual channel is equalized by amplifying and reflecting the optical signals at different positions with different amplification gains.

3. An optical amplifier comprising:
   a pumping optical source;
   a plurality of optical fibers for amplifying optical signals of a plurality of wavelengths using pumping light generated by the pumping optical source;
   a plurality of gratings alternately connected to the optical fibers, for reflecting an optical signal of a specific wavelength among different wavelength optical signals amplified by the optical fibers; and
   a plurality of erbium doped fibers doped with samarium connected respectively to the gratings to give a loss to optical signals passing through the gratings,
   characterized in that when optical signals for different channels have different powers, the optical signal power for each individual channel is equalized by amplifying and reflecting the optical signals at different positions with different amplification gains.

4. The optical amplifier as claimed in claim 3, wherein the plurality of optical fibers are erbium doped and one optical fiber among said plurality of erbium doped fibers is additionally doped to enable gain swing of the one erbium doped optical fibers to be larger than the gain swing of the other erbium doped optical fibers, where the wavelength of said one optical fiber is dominant as compared to the wavelengths of the other optical fibers.

5. The optical amplifier as claimed in claim 4, wherein said one optical fiber among the plurality of optical fibers is one selected from the group consisting of a phosphosilicate erbium doped fiber, an alumino-phosphosilicate erbium doped fiber, a samarium-doped phosphosilicate erbium doped fiber, and a samarium-doped alumino-phosphosilicate erbium doped fiber.

6. The optical amplifier as claimed in claim 4, wherein said one optical fiber among the plurality of optical fibers is one selected from the group consisting of a germanosilicate erbium doped fiber, and a samarium-doped germanosilicate erbium doped fiber.

7. The optical amplifier as claimed in claim 4, wherein said one optical fiber among the plurality of optical fibers is one selected from the group consisting of an aluminosilicate erbium doped fiber, and a samarium-doped aluminosilicate erbium doped fiber.

8. An optical amplifier comprising:
   a pumping optical source;
   an optical fiber for amplifying continuous spectral optical signals using pumping light generated by the pumping optical source; and
   a chirped grating for reflecting the amplified continuous spectral optical signals according to different wavelengths at different positions and outputting the result to the optical fiber amplifier, wherein when the powers of the continuous spectral optical signals are different at different wavelengths, the optical signal powers are equalized by amplifying and reflecting the optical signals at different positions with different amplification gains.

9. The optical amplifier as claimed in claim 8, wherein the optical fiber has a loss.

10. The optical amplifier as claimed in claim 9, wherein the optical fiber is doped with erbium and samarium.

11. The optical amplifier as claimed in claim 8, wherein the chirped grating includes a long period grating on its upper portion to attenuate optical signals when reflected.

12. The optical amplifier as claimed in claim 8, wherein the chirped grating includes a blazed grating on its upper portion to attenuate an optical signal when reflected.

13. The optical amplifier as claimed in claim 8, wherein the chirped grating further includes a grating chirped in the opposite direction to the chirped grating to compensate for dispersion of optical signals caused by the chirped grating.

14. An optical amplifier comprising, a first power equalization amplification unit said first power amplification unit comprising:
- a pumping optical source;
- a plurality of optical fibers for amplifying optical signals of a plurality of wavelengths using pumping light generated by the pumping optical source;
- a plurality of gratings alternately connected to the optical fibers, for reflecting an optical signal of a specific wavelength among different wavelength optical signals amplified by the optical fibers; and
- a plurality of means connected a respectively to the gratings to give losses to optical signals passing through the gratings, wherein each of said means is one of a bandpass filter, an attenuator or an erbium doped fiber,
- characterized in that when optical signals for different channels have different powers, the optical signal power for each individual channel is equalized by amplifying and reflecting the optical signals at different positions with different amplification gains.

15. The optical amplifier as set forth in claim 14, further comprising a second power equalization amplification unit, wherein said second power equalization amplification unit comprises:
- a second pumping optical source;
- a second plurality of optical fibers for amplifying optical signals of a plurality of wavelengths using pumping light generated by the second pumping optical source;
- a second plurality of gratings alternately connected to the second plurality of optical fibers, for reflecting an optical signal of a specific wavelength among different wavelength optical signals amplified by the second plurality of optical fibers; and
- a second plurality of means connected respectively to the gratings to give losses to optical signals passing through the gratings, wherein each of said second means is one of a bandpass filter, an attenuator or an erbium doped fiber,
- characterized in that when optical signals for different channels have different powers, the optical signal power for each individual channel is equalized by amplifying and reflecting the optical signals at different positions with different amplification gains in a sequence different from that of the first power equalization amplification unit.

16. The optical amplifier as set forth in claim 15, further comprising:
- an optical circulator for outputting input optical signals to the first power equalization amplification unit, outputting optical signals reflected by the first power equalization amplification unit to the second power equalization amplification unit, and outputting input optical signals reflected by the second power equalization amplification unit to a transmission path.

17. The optical amplifier a s set forth in claim 15, further comprising:
- a first optical circulator and a second optical circulator, said first optical circulator outputting input optical signals to the first power equalization amplification unit, outputting optical signals reflected by the first power equalization amplification unit to second optical circulator, said second optical circulator outputting the optical signals received from the first optical circulator to the second power equalization amplification unit, and outputting input optical signals reflected by the second power equalization amplification unit to a transmission path.

18. An optical amplifier comprising, a first power equalization amplification unit said first power amplification unit comprising:
- a pumping optical source;
- a plurality of optical fibers for amplifying optical signals of a plurality of wavelengths using pumping light generated by the pumping optical source;
- a plurality of gratings alternately connected to the optical fibers, for reflecting an optical signal of a specific wavelength among different wavelength optical signals amplified by the optical fibers; and
- a chirped grating for reflecting he amplified continuous spectral optical signals at different wavelengths at different positions and outputting the result to the optical fiber amplifier,
- characterized in that when optical signals for different channels have different powers, the optical signal power for each individual channel is equalized by amplifying and reflecting the optical signals at different positions with different amplification gains.

19. The optical amplifier as set forth in claim 18, further comprising a second power equalization amplification unit, wherein said second power equalization amplification unit comprises:
- a second pumping optical source;
- a second plurality of optical fibers for amplifying optical signals of a plurality of wavelengths using pumping light generated by the second pumping optical source;
- a second plurality of gratings alternately connected to the second plurality of optical fibers, for reflecting an optical signal of a specific wavelength among different wavelength optical signals amplified by the second plurality of optical fibers; and
- a second chirped grating for reflecting the amplified continuous spectral optical signals at different wavelengths at different positions and outputting the result to the optical fiber amplifier,
- characterized in that when optical signals for different channels have different powers, the optical signal power for each individual channel is equalized by amplifying and reflecting the optical signals at different positions with different amplification gains in a sequence different from that of the first power equalization amplification unit.

20. The optical amplifier as set forth in claim 19, further comprising:

an optical circulator for outputting input optical signals to the first power equalization amplification unit, outputting optical signals reflected by the first power equalization amplification unit to the second power equalization amplification unit, and outputting input optical signals reflected by the second power equalization amplification unit to a transmission path.

21. The optical amplifier as set forth in claim 19, further comprising:

a first optical circulator and a second optical circulator, said first optical circulator outputting input optical signals to the first power equalization amplification unit, outputting optical signals reflected by the first power equalization amplification unit to second optical circulator, said second optical circulator outputting the optical signals received from the first optical circulator to the second power equalization amplification unit, and outputting input optical signals reflected by the second power equalization amplification unit to a transmission path.

* * * * *